(12) United States Patent
Han et al.

(10) Patent No.: US 9,008,213 B2
(45) Date of Patent: Apr. 14, 2015

(54) METHOD AND APPARATUS FOR TRANSMITTING CONTROL INFORMATION FOR INTERFERENCE MITIGATION IN MULTIPLE ANTENNA SYSTEM

(75) Inventors: Shuangfeng Han, Suwon-si (KR);
Hyeon-Woo Lee, Suwon-si (KR);
Ho-Kyu Choi, Seongnam-si (KR);
Mi-Hyun Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1119 days.

(21) Appl. No.: 12/661,155

(22) Filed: Mar. 11, 2010

(65) Prior Publication Data
US 2010/0232539 A1    Sep. 16, 2010

(30) Foreign Application Priority Data

Mar. 11, 2009  (KR) .................. 10-2009-0020880
Apr. 28, 2009  (KR) .................. 10-2009-0037359
Jun. 22, 2009  (KR) .................. 10-2009-0055371

(51) Int. Cl.
*H04B 15/00*   (2006.01)
*H04B 7/02*    (2006.01)
*H04B 7/06*    (2006.01)
*H04J 11/00*   (2006.01)
*H04L 25/03*   (2006.01)

(52) U.S. Cl.
CPC .............. *H04B 7/024* (2013.01); *H04B 7/0639* (2013.01); *H04J 11/0033* (2013.01); *H04J 11/0053* (2013.01); *H04L 25/03343* (2013.01); *H04L 2025/03808* (2013.01)

(58) Field of Classification Search
CPC ....................................................... H04B 7/0639
USPC .................................................. 375/267, 285
See application file for complete search history.

(56) References Cited

U.S. PATENT DOCUMENTS

| | | | |
|---|---|---|---|
| 2005/0003252 A1 | 1/2005 | Breault | |
| 2009/0046569 A1* | 2/2009 | Chen et al. | 370/203 |
| 2010/0002598 A1* | 1/2010 | Pan et al. | 370/252 |
| 2010/0027456 A1* | 2/2010 | Onggosanusi et al. | 370/312 |
| 2011/0045783 A1* | 2/2011 | Luschi et al. | 455/69 |

FOREIGN PATENT DOCUMENTS

| | | |
|---|---|---|
| JP | 2008-079262 | 4/2008 |
| JP | 2008-131352 | 6/2008 |

(Continued)

OTHER PUBLICATIONS

International Search Report dated Oct. 20, 2010 in connection with International Patent Application No. PCT/KR2010/001525.

(Continued)

*Primary Examiner* — Michael Neff

(57) ABSTRACT

A multiple antenna system including a mobile station and a base station are operable to perform a method for transmitting control information for interference mitigation. A Mobile Station (MS) can transmit control information for interference mitigation. The MS determines a first Precoding Matrix Index (PMI) and a second PMI for interference from an adjacent Base Station (BS). Based on a correlation level from correlation values between one of the first PMI and second PMI and the remaining PMIs in the codebook, the MS determines a level of a subset of PMIs, and feeds back information indicating the correlation level.

26 Claims, 9 Drawing Sheets

(56) References Cited

FOREIGN PATENT DOCUMENTS

| JP | 2011-508576 | 3/2011 |
| KR | 1020050015730 A | 2/2005 |
| KR | 1020080015352 A | 2/2008 |
| KR | 10-2008-0051532 | 6/2008 |
| KR | 1020080083808 A | 9/2008 |
| WO | WO 2008/104907 A2 | 9/2008 |
| WO | WO 2008/131352 A1 | 10/2008 |
| WO | WO 2009/023686 A2 | 2/2009 |

OTHER PUBLICATIONS

Written Opinion of the International Searching Authority dated Oct. 20, 2010 in connection with International Patent Application No. PCT/KR2010/001525.

Chinese Office Action dated Sep. 29, 2013 in connection with Chinese Patent Application No. 201080010955.5, 11 pages.

Dongguk Lim, et al., "PMI Restriction for the downlink Closed-loop MIMO", IEEE C802. 16m-08/430r1, Jul. 14, 2008, 7 pages.

Chan-Byoung Chae, et al., "Coordinated Beamforming for Multiuser MIMO Systems with Limited Feedforward", Signals, Systems, Systems and Computers, 2006. ACSSC'06, Nov. 1, 2006, 5 pages.

Notice of Preliminary Rejection dated Jan. 31, 2014 in connection with Japanese Patent Application No. 2011-553955, 5 pages.

Notice of Patent Grant dated May 27, 2014 in connection with Japanese Patent Application No. 2011-553955, 5 pages.

Preliminary Notice of First Office Action dated Jul. 30, 2014 in connection with Taiwanese Patent Application No. 099107139, 7 pages.

* cited by examiner

AVERAGE CHANNEL POWER VS CORRELATION TO WORST PMI

AVERAGE CHANNEL POWER VS CORRELATION TO BEST PMI

METHOD AND APPARATUS FOR TRANSMITTING CONTROL INFORMATION FOR INTERFERENCE MITIGATION IN MULTIPLE ANTENNA SYSTEM

CROSS-REFERENCE TO RELATED APPLICATION(S) AND CLAIM OF PRIORITY

The present application claims the benefit under 35 U.S.C. § 119 to an application filed in the Korean Intellectual Property Office on Mar. 11, 2009 and assigned Ser. No. 10-2009-0020880, a Korean patent application filed in the Korean Intellectual Property Office on Apr. 28, 2009 and assigned Ser. No. 10-2009-0037359 and a Korean patent application filed in the Korean Intellectual Property Office on Jun. 22, 2009 and assigned Ser. No. 10-2009-0055371, the contents of which are herein incorporated by reference.

TECHNICAL FIELD OF THE INVENTION

The present invention relates to a multiple antenna system. More particularly, the present invention relates to a method and apparatus for transmitting control information for interference mitigation in a multiple antenna system.

BACKGROUND OF THE INVENTION

Orthogonal Frequency Division Multiplexing (OFDM) and multiple antenna (i.e., Multiple Input Multiple Output (MIMO)) techniques have attracted extensive attention for its high spectral efficiency in Long Term Evolution (LTE) and Institute of Electrical and Electronics Engineers (IEEE) 802.16 standards.

OFDM based systems do not suffer from interference among multiplexed users within a cell given perfect frequency synchronization. However, when it comes to a multi-cell environment, InterCell Interferences (ICIs) between adjacent cells are induced which seriously degrade cell edge user performance.

Intercell interference mitigation techniques are generally classified as three types: interference randomization, interference cancellation, and interference coordination. The interference randomization is aimed at randomizing interference and allowing interference mitigation through processing gain. The interference cancellation techniques are proposed to cancel interference at receivers by using multiple antenna techniques or Interleaved Division Multiple Access (IDMA) schemes. The interference coordination is based on the concept that a well-designed coordination of resource among Mobile Stations (MSs) in adjacent cells can reduce interference and improve user capacity and coverage at cell edge.

FIG. 1 illustrates intercell interference experienced by a cell edge MS in a MIMO system according to the conventional art.

Referring to FIG. 1, it is assumed that a serving BS 100 and an interfering BS 120 use the same codebook for precoding, and are connected with each other through a backbone network. In addition, in an environment in which the serving BS 100 and the interfering BS 120 transmit data using the same frequency band, an MS 110 located at a cell edge of the serving BS 100 suffers from interference from the interfering BS 120, which is an adjacent BS. H1 105 is a channel matrix between the serving BS 100 and the MS 110, and H2 115 is a channel matrix between the interfering BS 120 and the MS 110.

In order to mitigate interference, the MS 110 searches a reference signal for a Precoding Matrix Index (PMI) (hereinafter, referred to as 'the worst PMI') causing high interference or a PMI (hereinafter, referred to as 'the best PMI') causing low interference. The MS 110 can feed back the searched worst or best PMI to the serving BS 100 and then, the serving BS 100 informs the interfering BS 120 of the worst or best PMI fed back from the MS 110. The interfering BS 120 restricts the fed back worst PMI among its using PMIs (hereinafter, referred to as 'PMI restriction') or uses the fed back best PMI among its using PMIs (hereinafter, referred to as 'PMI recommendation'), thereby being able to mitigate the interference of the MS 110.

However, the feedback of only the worst or best PMI to mitigate the interference is not enough because other PMIs besides the worst PMI may also cause interference in the MS 110, and other PMIs besides the best PMI may also work well for interference mitigation. Therefore, it is preferred if multiple PMIs can be fed back for either PMI restriction or recommendation. However, the difficulty is that a feedback of a PMI subset from the MS 110 to the serving BS 100 will incur too much overhead.

Thus, there is a need for a method and apparatus for efficient PMI feedback for interference cancellation in a multiple antenna system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, one aspect of the present invention is to provide a method and apparatus for efficiently transmitting control information for interference cancellation in a multiple antenna system.

Another aspect of the present invention is to provide a method and apparatus for, upon Precoding Matrix Index (PMI) feedback, reducing overhead in a multiple antenna system.

The above aspects are achieved by providing a method and apparatus for transmitting control information for interference mitigation in a multiple antenna system.

According to one aspect of the present invention, a Mobile Station (MS) operation method for transmitting control information for interference mitigation in a multiple antenna system is provided. The method includes determining one of a first PMI and a second PMI for interference from an adjacent Base Station (BS), determining a size of a subset of PMIs based on a correlation level from correlation values between one of the first PMI and second PMI and the remaining PMIs in the codebook, and feeding back information indicating the correlation level corresponding the size of a subset of PMIs.

According to a further aspect of the present invention, a serving BS operation method for transmitting control information for interference mitigation in a multiple antenna system is provided. The method includes receiving a correlation level indicating a level of a subset of PMIs from at least one or more MSs, and exchanging PMI subset information received from the at least one or more MSs with adjacent BSs, and coordinating the PMI use of the adjacent BSs.

According to a further another aspect of the present invention, an interfering BS operation method for transmitting control information for interference mitigation in a multiple antenna system is provided. The method includes receiving a correlation level and a first PMI or second PMI from a corresponding BS, and determining a PMI subset using the correlation level and the first PMI or second PMI.

According to a yet another aspect of the present invention, a multiple antenna system for transmitting control information for interference mitigation is provided. The system includes a plurality of MSs and a serving BS. Based on correlation levels between one of a first PMI and a second PMI and the remaining PMIs in the codebook, the plurality of MSs feed back a plurality of PMI subsets for interference from an adjacent BS. Based on the plurality of PMI subsets fed back from the plurality of MSs, the serving BS exchanges with adjacent BSs, and coordinates the PMI use of the adjacent BSs.

According to a still another aspect of the present invention, an MS operation method for transmitting control information for interference mitigation in a multiple antenna system is provided. The method includes determining the cross correlations between one of a first PMI and a second PMI and the remaining PMIs in the codebook, respectively, sorting the cross correlation values in ascending order, determining the number of at least one or more cross correlation values which to feed back among the sorted cross correlation values, and feeding back related information for interference mitigation including a correlation level indicating the determined number of cross correlation values.

According to a still another aspect of the present invention, a serving BS operation method for transmitting control information for interference mitigation in a multiple antenna system is provided. The method includes receiving a correlation level indicating a level of a subset of PMIs from at least one or more MSs, constructing a recommended PMI subset and a restricted PMI subset based on the correlation level, and transmitting the recommended PMI subset and the restricted PMI subset to adjacent BSs and coordinating the PMI use of the adjacent BSs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein should be understood based on the descriptions made herein.

A method and apparatus for transmitting control information for interference mitigation in a multiple antenna system according to an exemplary embodiment of the present invention are described below. Particularly, a method and apparatus for Precoding Matrix Index (PMI) feedback for interference mitigation is described below.

Figure 1:
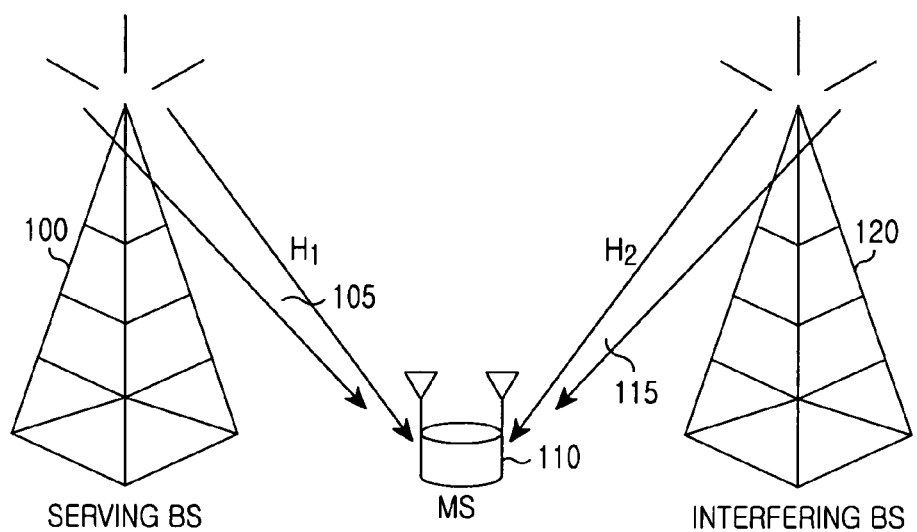
FIG. 1 illustrates intercell interference experienced by a cell edge Mobile Station (MS) in a Multiple Input Multiple Output (MIMO) system.
Figure 2:
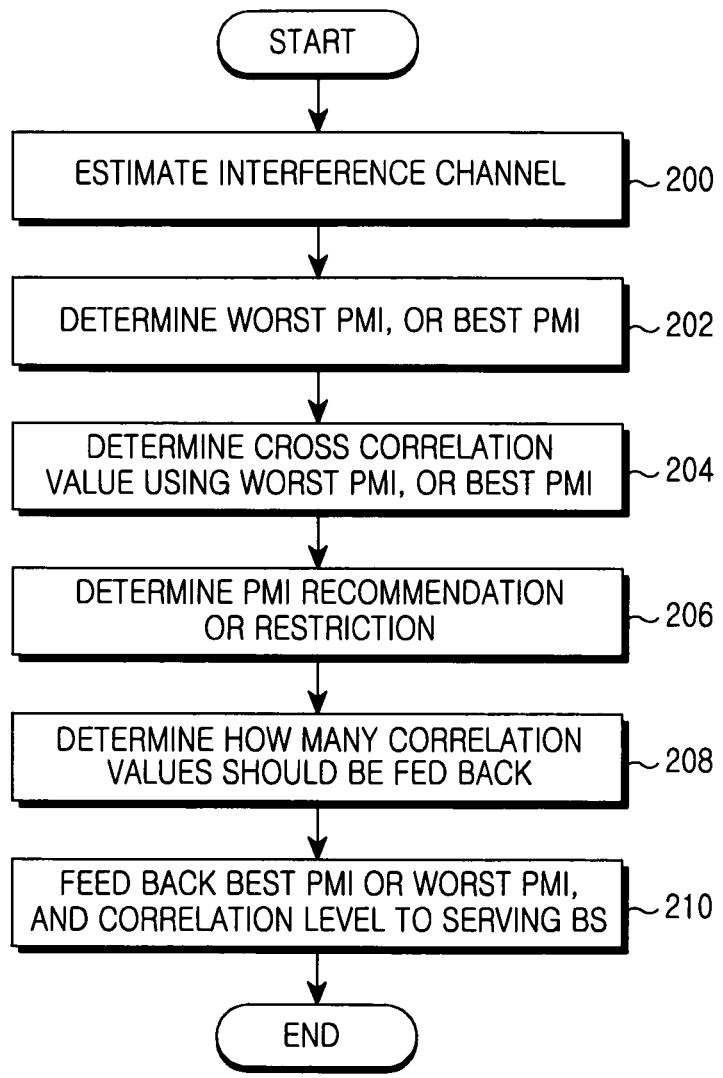
FIG. 2 illustrates an MS operation for transmitting control information for interference mitigation in a multiple antenna system according to an exemplary embodiment of the present invention.

FIG. 2 illustrates an MS operation for transmitting control information for interference mitigation in a multiple antenna system according to an exemplary embodiment of the present invention.

Referring to FIG. 2, in step 200, an MS measures dominant DownLink (DL) interference channels based on a reference signal, and determines possible interference power of the dominant interference links based on each PMI ($w^1, w^2, \ldots, w^N$) in the codebook.

After that, in step 202, the MS determines the worst or best PMI from the possible interference power of the dominant interference links. For example, the MS determines as the worst PMI a PMI causing the highest interference in an adjacent BS, and determines as the best PMI a PMI mitigating interference in the adjacent BS.

Then, in step 204, the MS determines the cross correlation between the determined worst or best PMI and each remaining PMI. Assuming that the worst or best PMI is equal to '$w^k$', 'N' different correlation values ($\rho_{1,k}, \rho_{2,k}, \ldots, \rho_{N,k}$) of descending order can be given as in Equation 1 below. There can be at least one or more same correlation values among the correlation values between the worst or best PMI and the remaining PMIs. That is, a PMI having a correlation value ($\rho_{1,k}$) can be one or more in number.

$$\rho_{i,k}=|(w^i)^H \times w^k| i=1, \ldots, N, i \neq k \quad [\text{Eqn. 1}]$$

In Equation 1, the '$\rho_{i,k}$' is a correlation value between the '$w^k$' and an $i^{th}$ PMI, the 'N' is the number of PMIs in the codebook, and the 'H' is a conjugate transpose matrix. Here, it is assumed that there are 'M' different correlation values ($r_1, \ldots, r_M$). The remaining PMIs can have the same correlation with the worst or best PMI.

The MS can reduce overhead of a feedback of a PMI subset by using the correlations between the worst or best PMI and the remaining PMIs. The relationship between the correlations of the remaining PMIs to the worst or best PMI and channel power is described in FIGS. 6 to 9 below.

After that, in step 206, based on a received Signal to Interference and Noise Ratio (SINR) and interference power associated with a different PMI, the MS determines whether to recommend a PMI mitigating interference in an adjacent BS (hereinafter, referred to as 'PMI recommendation') or whether to restrict a PMI causing interference in the adjacent BS (hereinafter, referred to as 'PMI restriction'), and feeds back the result as an event-driven feedback report through a feedback channel using one of two codewords. For example, in case where a 1-bit indicator is expressed with two codewords (a, b), it is '1' if the codeword (a) is transmitted and '0' if the codeword (b) is transmitted.

For example, the MS chooses PMI restriction in an environment suffering from high interference from an adjacent BS, and chooses PMI recommendation in an environment requiring interference mitigation from the adjacent BS.

According to implementation, a result of determining one of PMI recommendation and PMI restriction can be fed back together with other related information (i.e., the worst or best PMI and a correlation level determining a PMI subset) to a serving BS.

Then, in step 208, based on a received SINR and a target SINR, the MS determines how many correlation values should be fed back. In other words, in order or in the order of highly mitigating interference, the MS chooses correlation values of a predetermined number causing the highest interference among correlation values ($r_1, \ldots, r_M$) sorted in descending order.

Here, the MS transmits a correlation level (assumed one bit) with no feedback of real correlation values. For instance, for PMI restriction, the MS feeds back a control bit '1' as a correlation level when feeding back only a PMI subset corresponding to a correlation value ($r_1$) among the correlation values ($r_1, \ldots, r_M$) of the remaining PMIs to the worst PMI sorted in descending order, and feeds back a control bit '0' when feeding back PMI subsets each corresponding to correlation values ($r_1$) and ($r_2$) among the correlation values ($r_1, \ldots, r_M$). According to implementation, assuming that a correlation level is two bits, an MS feeds back control bits '00' as a correlation level when feeding back a PMI subset corresponding to a correlation value ($r_1$), and feeds back control bits '01' when feeding back PMI subsets each corresponding to correlation values ($r_1$) and ($r_2$), and feeds back control bits '10' when feeding back PMI subsets each corresponding to correlation values ($r_1$), ($r_2$), and ($r_3$), and feeds back control bits '11' when feeding back PMI subsets each corresponding to correlation values ($r_1$), ($r_2$), ($r_3$), and ($r_4$).

Then, in step 210, the MS feeds back related information for interference mitigation (i.e., the worst or best PMI, a correlation level determining a PMI subset, and an information bit to indicate whether to recommend or restrict a PMI subset corresponding to the correlation level) to the serving BS. The MS determines a PMI subset corresponding to several correlation values through the correlation level. For example, when the correlation level is one bit, the MS can construct two PMI subsets and, when the correlation level is two bits, the MS can construct four PMI subsets.

According to implementation, after choosing PMI recommendation in step 206, the MS can also feed back the best PMI and a correlation level determining a level of a PMI subset and, in addition, the worst PMI that causes the highest interference power. In addition, the MS can feed back an additional information bit (i.e., one bit) indicating a recommended PMI subset (i.e., a PMI corresponding to a correlation value ($r_M$) or PMIs corresponding to correlation values ($r_M$ and $r_{M-1}$).

Thereafter, the MS terminates the procedure according to the exemplary embodiment of the present invention.

Figure 3:
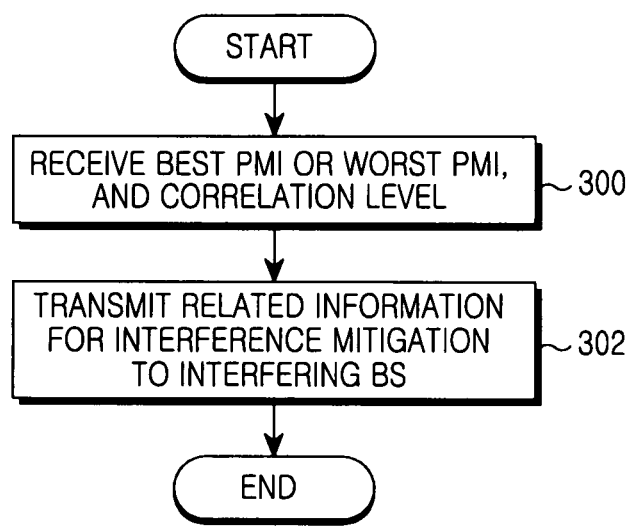
FIG. 3 illustrates a serving Base Station (BS) operation for transmitting control information for interference mitigation in a multiple antenna system according to an exemplary embodiment of the present invention.

FIG. 3 illustrates a serving BS operation for transmitting control information for interference mitigation in a multiple antenna system according to an exemplary embodiment of the present invention.

Referring to FIG. 3, in step 300, a serving BS receives related information for interference restriction and interference mitigation from an MS. The related information can be the worst or best PMI, a correlation level determining a PMI subset, information indicating whether to recommend or restrict a PMI subset corresponding to the correlation level, and so forth. For example, when a correlation level is equal to '1', a PMI corresponding to a correlation ($r_M$) to the worst or best PMI is restricted or recommended. When the correlation level is equal to '0', PMIs corresponding to correlations ($r_M$ and $r_{M-1}$) to the worst or best PMI are restricted or recommended.

Then, in step 302, the serving BS transmits the worst or best PMI, the correlation level determining the PMI subset, the information indicating whether to recommend or restrict the PMI subset corresponding to the correlation level, and so forth, to an interfering BS. According to implementation, the serving BS can also determine a PMI subset from the worst or best PMI and the correlation level determining the PMI subset and transmit the recommended or restricted PMI subset to the interfering BS. The serving BS has the same information on the relationship between a correlation value and a PMI as the MS and thus, the serving BS can determine a corresponding PMI subset from a correlation level fed back from the MS.

Thereafter, the serving BS terminates the procedure according to the exemplary embodiment of the present invention.

Figure 4:
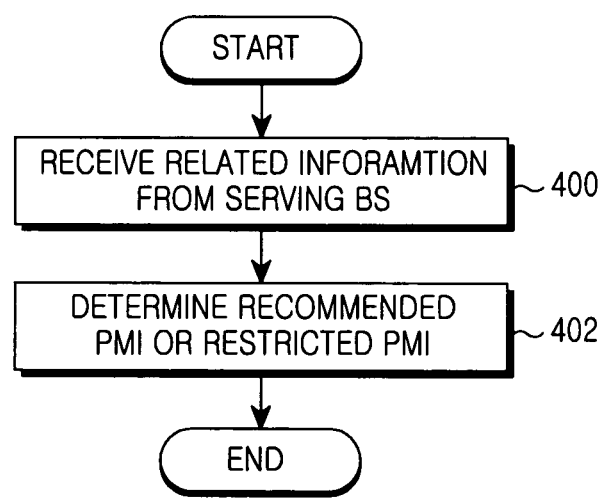
FIG. 4 illustrates an interfering BS operation for transmitting control information for interference mitigation in a multiple antenna system according to an exemplary embodiment of the present invention.

FIG. 4 illustrates an interfering BS operation for transmitting control information for interference mitigation in a multiple antenna system according to an exemplary embodiment of the present invention.

Referring to FIG. 4, in step 400, an interfering BS receives related information (e.g., the worst or best PMI and a correlation level determining a PMI subset) from a serving BS. According to implementation, the interfering BS can directly receive a restricted or recommended PMI subset from the serving BS.

In step 402, the interfering BS determines a PMI subset from the related information and restricts the use of the determined PMI subset for PMI restriction or recommends the use of the determined PMI subset for PMI recommendation.

Thereafter, the interfering BS terminates the procedure according to the exemplary embodiment of the present invention.

Figure 5:
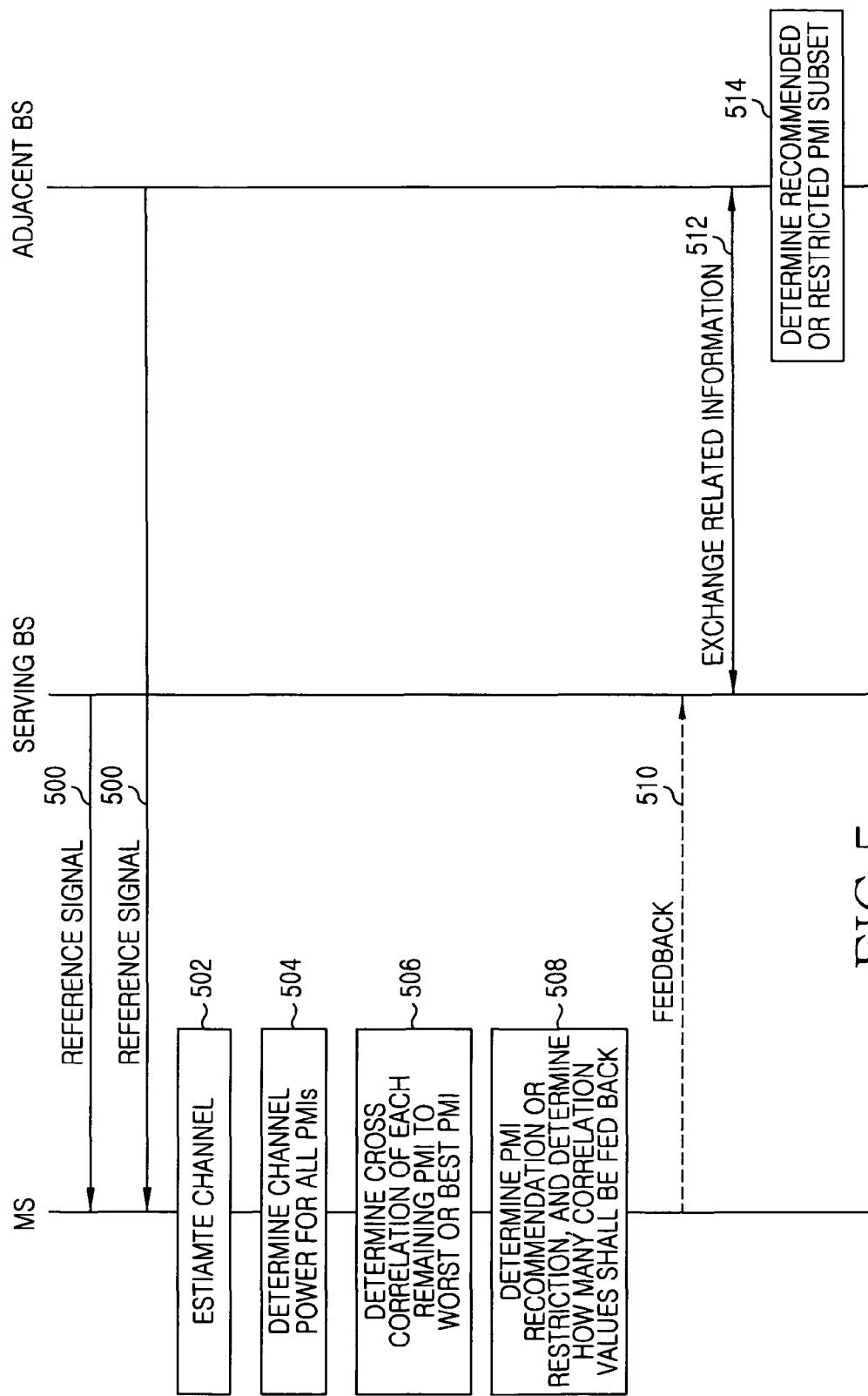
FIG. 5 illustrate a process for transmitting control information for interference mitigation in a multiple antenna system according to an exemplary embodiment of the present invention.

FIG. 5 illustrates a procedure for transmitting control information for interference mitigation in a multiple antenna system according to an exemplary embodiment of the present invention.

Referring to FIG. 5, in step 500, an MS receives reference signals from a serving BS and an adjacent BS, respectively. Then, in step 502, the MS measures dominant DL interference channels. Then, in step 504, the MS determines interference power for all PMIs in the codebook.

Thereafter, in step 506, the MS determines the worst or best PMI from possible interference power of the dominant interference links, and determines the cross correlation between the determined worst or best PMI and each remaining PMI.

Then, in step 508, based on a received SINR and interference power associated with the remaining PMIs, the MS determines whether to recommend a PMI mitigating interference in an adjacent BS (PMI recommendation) or whether to restrict a PMI causing interference in the adjacent BS (PMI restriction) and, based on a received SINR and a target SINR, the MS determines how many correlation values should be fed back.

Thereafter, in step 510, the MS feeds back related information for interference mitigation (i.e., the worst or best PMI, a correlation level determining a PMI subset, and an information bit indicating whether to recommend or restrict a PMI subset corresponding to the correlation level) to a serving BS. The MS determines a PMI subset corresponding to several correlation values through the correlation level. For example, when the correlation level is one bit, the MS can construct two PMI subsets and, when the correlation level is two bits, the MS can construct four PMI subsets.

According to implementation, after determining PMI recommendation or PMI restriction, the MS can also feed back the result through a separate feedback channel using one of two codewords.

In step 512, the serving BS delivers related information for interference mitigation fed back from the MS, to an adjacent BS. According to implementation, the serving BS can also determine a recommended or restricted PMI subset from the related information for interference mitigation fed back from the MS, and deliver the determined PMI subset to the adjacent BS.

In step 514, after the related information for interference mitigation is provided from the serving BS, the adjacent BS determines a restricted or recommended PMI subset from the related information.

Figure 6:
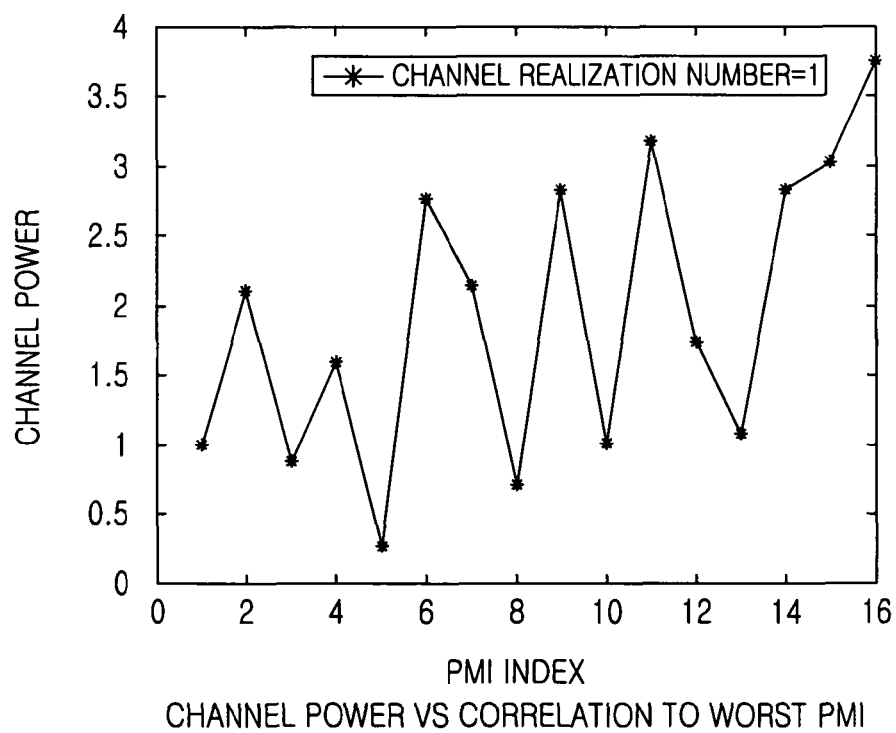
FIG. 6 illustrates a graph of the relationship of channel power of each PMI to correlation of each remaining PMI to the worst PMI according to the present invention.

FIG. 6 illustrates the relationship of channel power of each PMI to correlation of each remaining PMI to the worst PMI in consideration of the total sixteen PMIs in an environment with four transmit antennas and two receive antennas (channel realization number=1).

A horizontal axis is a PMI index sorted with the correlations between the worst PMI and the remaining PMIs increasing, and a vertical axis is a channel power value of a corresponding PMI.

Assuming that a correlation value between the worst PMI and a PMI (0) is equal to $\rho^0$, a correlation value between the worst PMI and a PMI (1) is equal to '$\rho^1$', ..., and a correlation value between the worst PMI and a PMI (16) is equal to '$\rho^{16}$', the relationship of the correlation values is given as $\rho^0 < \rho^1, \ldots, < \rho^{16}$.

Figure 7:
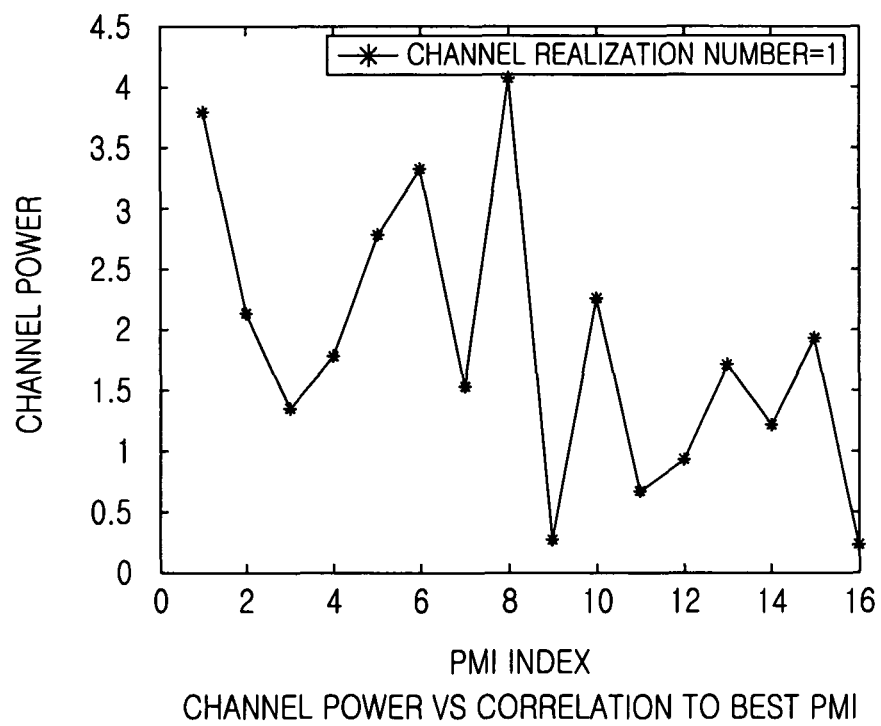
FIG. 7 illustrates a graph of the relationship of channel power of each PMI to correlation of each remaining PMI to the best PMI according to the present invention.

FIG. 7 illustrates the relationship of channel power of each PMI to correlation of each remaining PMI to the best PMI in consideration of the total sixteen PMIs in an environment with four transmit antennas and two receive antennas (channel realization number=1).

Referring to FIG. 7, a horizontal axis is a PMI index sorted with the correlations between the best PMI and the remaining PMIs increasing, and a vertical axis is a channel power value of a corresponding PMI.

Assuming that a correlation value between the best PMI and a PMI (0) is equal to '$\rho^0$', a correlation value between the best PMI and a PMI (1) is equal to '$\rho^1$', ..., and a correlation value between the best PMI and a PMI (16) is equal to '$\rho^{16}$', the relationship of the correlation values is given as $\rho^0 < \rho^1, \ldots, < \rho^{16}$.

From FIGS. 6 and 7, it can be appreciated that the relationship between correlations of the remaining PMIs to the worst or best PMI and channel power of the remaining PMIs is rather random. Due to this, it is difficult to feed back a PMI with limited overhead to a serving BS for which PMIs are restricted or recommended.

Figure 8:
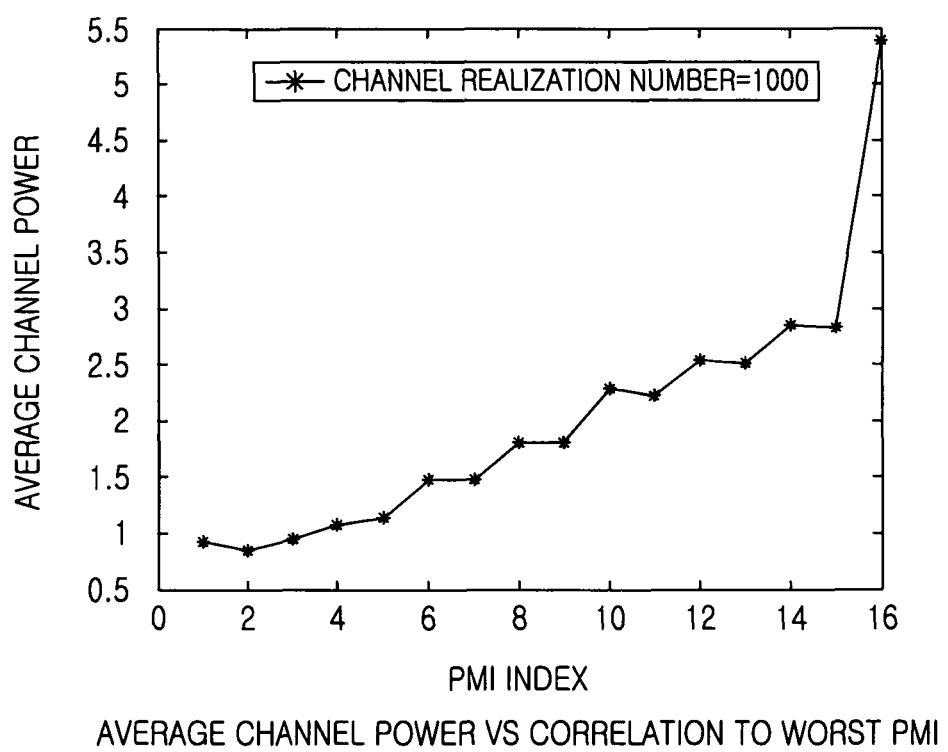
FIG. 8 illustrates a graph of the relationship of average channel power of each PMI to correlation of each remaining PMI to the worst PMI according to the present invention.

In the experiment environment where channel realizations are equal to '1000', when summing up all corresponding channel power and determining an average value, average channel power of PMIs dependent on correlations were obtained as illustrated in FIGS. 7 and 8.

FIG. 8 illustrates the relationship between average channel power of each PMI and the correlations of the remaining PMIs to the worst PMI according to the present invention (channel realization number=1000).

Referring to FIG. 8, on average sense, channel power associated with a PMI increases with the correlations between the worst PMI and the remaining PMIs increasing. The high correlations between the worst PMI and the remaining PMIs mean that, like the worst PMI, even the remaining PMIs can cause high interference in an adjacent BS. The low correlations between the worst PMI and the remaining PMIs mean that, unlike the worst PMI, the remaining PMIs do not cause high interference in the adjacent BS.

Figure 9:
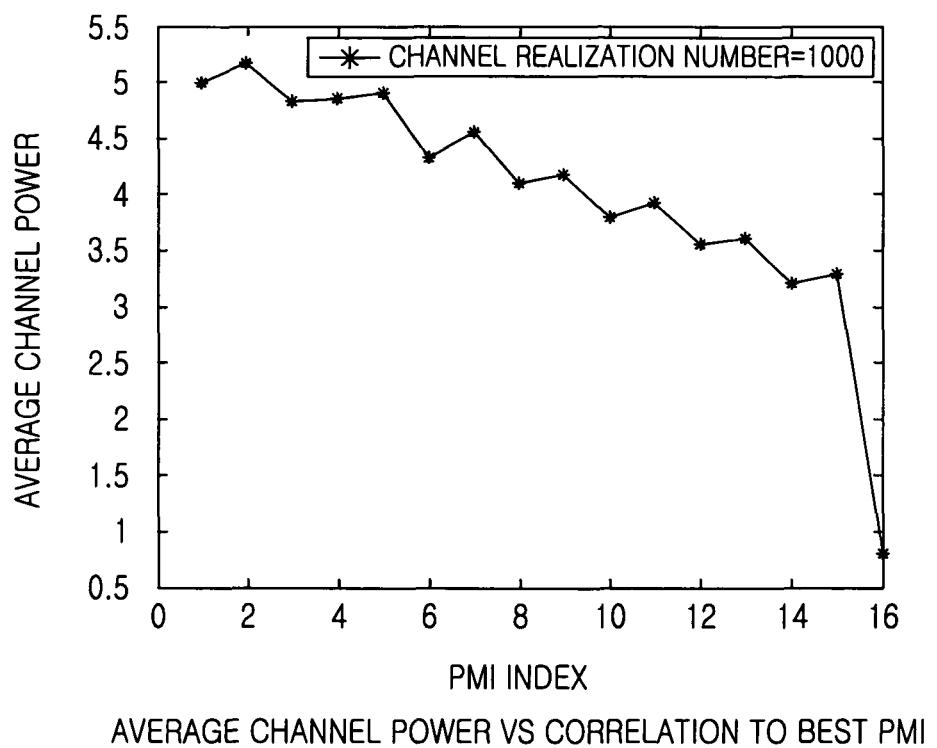
FIG. 9 illustrates a graph of the relationship of average channel power of each PMI to correlation of each remaining PMI to the best PMI according to the present invention.

FIG. 9 illustrates the relationship between average channel power of each PMI and the correlation of the remaining PMIs to the best PMI according to the present invention (channel realization number=1000).

Referring to FIG. 9, on average sense, channel power associated with a PMI decreases with the correlations between the best PMI and the remaining PMIs increasing. The high correlations between the best PMI and the remaining PMIs mean that, like the best PMI, even the remaining PMIs can mitigate high interference in an adjacent BS. The low correlations between the best PMI and the remaining PMIs mean that, unlike the best PMI, the remaining PMIs cannot mitigate high interference in the adjacent BS.

The present invention considers PMI feedback based on correlation on average sense, although it is possible that PMIs restricted due to high correlation to the worst PMI have little interference power and PMIs recommended due to high correlation to the best PMI have very large interference power.

PMI restriction with the worst PMI does not generally guarantee how much interference will be reduced compared to the interference before PMI restriction.

But, on average sense, restricting the worst PMI can reduce average interference power from the remaining PMIs. To further enhance performance improvement from restricting the worst PMI, additional information can also be fed back.

On average sense, recommending the best PMI can also substantially completely reduce dominant interference. But, it may be difficult to force an interfering BS to use the recommended PMI, because this may cause a big performance to an adjacent BS. Therefore, it will be better to recommend one PMI subset which can cause acceptable interference to a target user, because the interfering BS may choose a PMI from the recommended PMI subset which to use for its own user.

As described above, an exemplary embodiment of the present invention has an advantage of being capable of reducing overhead by feeding back a PMI subset using the correlations between the best PMI or worst PMI and the remaining PMIs. Also, the exemplary embodiment of the present invention has an advantage of being able to transmit other PMIs besides the best PMI or worst PMI and efficiently mitigate interference of a cell edge MS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Mobile Station (MS) operation method for transmitting control information for interference mitigation in a multiple antenna system, the method comprising:
    determining a Precoding Matrix Index (PMI) for interference mitigation from an adjacent Base Station (BS);
    based on correlation values between the PMI and each of remaining precoding matrices in a codebook, determining a correlation level corresponding to a size of a subset of precoding matrices, wherein the subset comprises precoding matrices jointly used to mitigate interference; and
    feeding back the PMI and information indicating the correlation level.

2. The method of claim 1, wherein the PMI is one of a PMI causing the highest interference in the adjacent BS, and, a PMI causing the lowest interference in the adjacent BS.

3. The method of claim 1, further comprising:
    determining the correlations between the PMI and each of the remaining precoding matrices in the codebook, respectively; and
    sorting the correlation values in descending order.

4. The method of claim 1, wherein the subset comprises a plurality of recommended precoding matrices and a plurality of restricted precoding matrices.

5. The method of claim 2, wherein a type of the PMI is instructed from a feedback polling A - MAP Information Element (TE) received from a BS.

6. The method of claim 1, further comprising:
    determining cross correlation values between the PMI and each of the remaining precoding matrices in the codebook, respectively; and
    sorting the cross correlation values in ascending order,
    wherein determining the correlation level comprises determining the number of at least one or more cross correlation values which to feed back among the sorted cross correlation values.

7. A serving Base Station (BS) operation method for transmitting control information for interference mitigation in a multiple antenna system, the method comprising:
    receiving a Precoding Matrix Index (PMI) and information indicating a correlation level corresponding to a size of a subset of precoding matrices from at least one or more Mobile Stations (MSs), wherein the subset comprises precoding matrices jointly used to mitigate the interference; and
    exchanging information on the subset with adjacent BSs, and coordinating precoding of the adjacent BSs.

8. The method of claim 7, further comprising broadcasting, in a bitmap, the use of at least one or more PMIs coordinated with the adjacent BSs.

9. The method of claim 7, wherein the PMI is one of a PMI causing the highest interference in the adjacent BS, and, a PMI causing the lowest interference in the adjacent BS.

10. An interfering Base Station (BS) operation method for transmitting control information for interference mitigation in a multiple antenna system, the method comprising:
    receiving a Precoding Matrix Index (PMI) and information indicating a correlation level corresponding to a size of a subset of precoding matrices from a corresponding BS, wherein the subset comprises precoding matrices jointly used to mitigate an interference; and
    determining the subset using the correlation level and the PML.

11. The method of claim 10, wherein the correlation level indicates a number of precoding matrices is determined in a Mobile Station (MS) based on correlation values between the PMI of each remaining precoding matrix in a codebook.

12. The method of claim 11, wherein the correlation values between the PMI and each of the remaining precoding matrices are linked with at least one or more PMIs.

13. The method of claim 10, wherein the PMI is one of a PMI causing the highest interference in an adjacent BS, and, a PMI causing the lowest interference in the adjacent BS.

14. The method of claim 10, further comprising determining whether to restrict or recommend the use of the PMI subset.

15. A multiple antenna system for transmitting control information for interference mitigation, the system comprising:
    at least one Mobile Station (MS) configured to, based on correlation values between a Precoding Matrix Index (PMI) and each remaining precoding matrix in a codebook, feedback the PMI and information indicating a correlation level corresponding to a size of a subset of precoding matrices for interference mitigation from an adjacent Base Station (BS); and a serving BS configured to, based on the PMI and the correlation level fed back from the at least one MS, exchange information on the subset with adjacent BSs, and coordinate precoding of the adjacent BSs.

16. The system of claim 15, wherein the at least one MS is configured to:
    determine the PMI for the interference from the adjacent BS, and
    determine the correlation level based on correlation values between the PMI and each of the remaining precoding matrices in the codebook.

17. The system of claim 16, wherein the at least one MS is configured to:
    determine the correlations between the PMI and each of the remaining precoding matrices in the codebook, respectively, and
    sort the correlation values in descending order.

18. The system of claim 16, wherein the subset comprises a plurality of recommended precoding matrices and a plurality of restricted precoding matrices.

19. The system of claim 15, wherein the PMI is one of a PMI causing the highest interference in the adjacent BS, and, a PMI causing the lowest interference in the adjacent BS.

20. The system of claim 16, wherein a type of the PMI is instructed from a feedback polling A - MAP Information Element (IE) received from a BS.

21. A serving Base Station (BS) operation method for transmitting control information for interference mitigation in a multiple antenna system, the method comprising:
   receiving a Precoding Matrix Index (PMI) and information indicating a correlation level corresponding to a size of a subset of precoding matrices from at least one or more Mobile Stations (MSs), wherein the subset comprises precoding matrices jointly used to mitigate the interference;
   based on the PMI and the correlation level, constructing one of a recommended PMI subset and a restricted PMI subset; and
   transmitting one of the recommended PMI subset and the restricted PMI subset to adjacent BSs and coordinating precoding of the adjacent BSs.

22. The method of claim 21, further comprising broadcasting, in a bitmap, the use of at least one or more PMIs coordinated with the adjacent BSs.

23. The method of claim 21, wherein the PMI is one of a PMI causing the highest interference in the adjacent BS, and, a PMI causing the lowest interference in the adjacent BS.

24. An apparatus for a Mobile Station (MS) in a multiple antenna system, the apparatus comprising:
   a controller configured to determine a Precoding Matrix Index (PMI) for interference mitigation from an adjacent Base Station (BS), and determine a correlation level corresponding to a size of a subset of precoding matrices based on correlation values between the PMI and each of the remaining precoding matrices in a codebook, wherein the subset comprises precoding matrices jointly used to mitigate an interference; and
   a transmitter configured to feed back information comprising the PMI and information indicating the correlation level.

25. An apparatus for a Base Station (BS) in a multiple antenna system, the apparatus comprising:
   a receiver configured to receive a Precoding Matrix Index (PMI) and information indicating a correlation level corresponding to a size of a subset of precoding matrices from at least one or more Mobile Stations (MSs), wherein the size of the subset comprises precoding matrices jointly used to mitigate an interference;
   a backhaul communication unit configured to exchange information on the subset with adjacent BSs; and
   a controller configured to coordinate precoding of the adjacent BSs.

26. An apparatus for a Base Station (BS) in a multiple antenna system, the apparatus comprising:
   a backhaul communication unit configured to receive a Precoding Matrix Index (PMI) and information indicating a correlation level corresponding to a size of a subset of precoding matrices from a corresponding BS, wherein the subset comprises precoding matrices jointly used to mitigate an interference; and
   a controller configured to determine the subset using the correlation level and the PML.

* * * * *